UNITED STATES PATENT OFFICE.

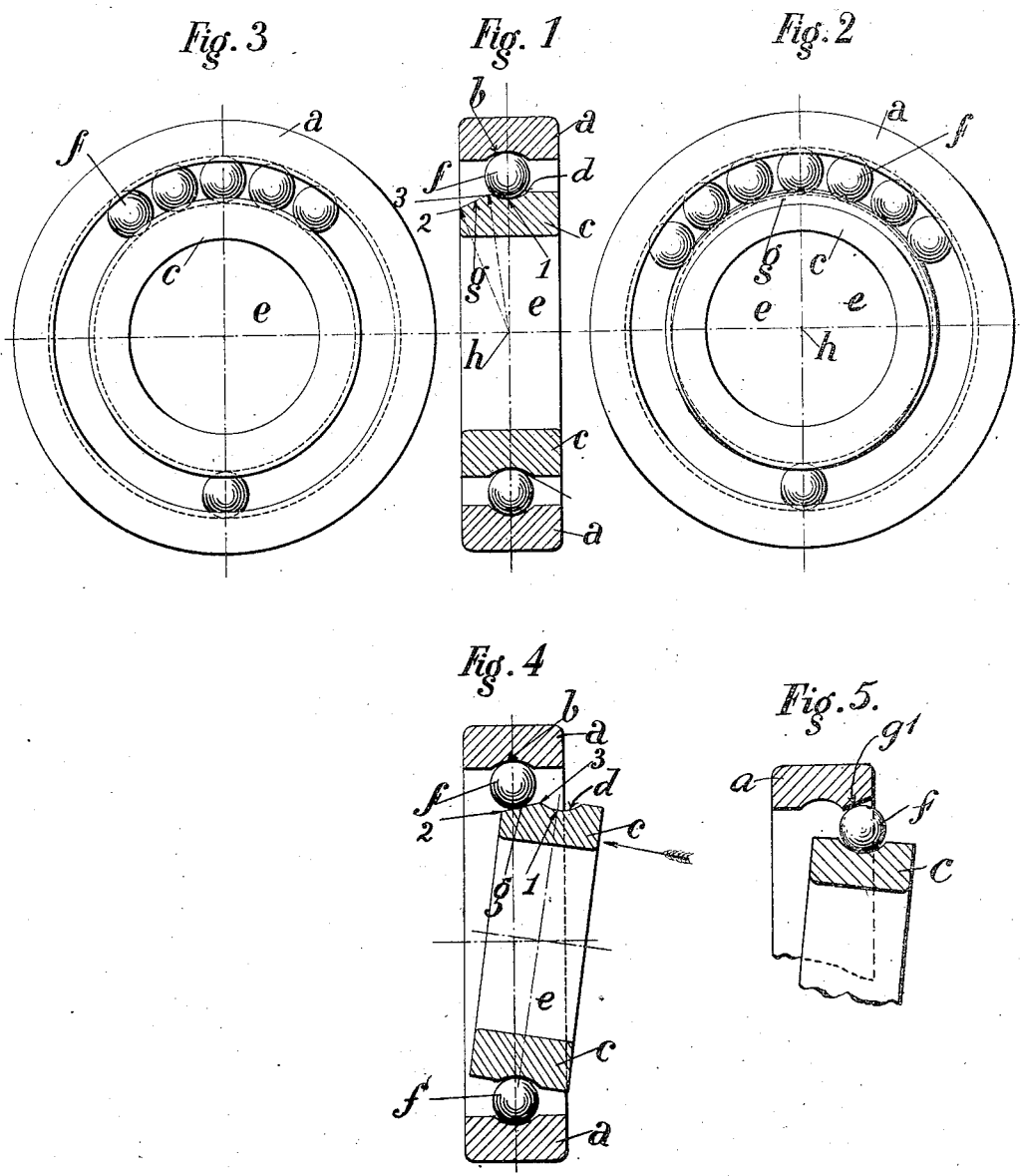

GUSTAV ADOLF WILHELM KOCH, OF PARIS, FRANCE.

BALL-BEARING.

942,392.

Specification of Letters Patent.   Patented Dec. 7, 1909.

Application filed July 14, 1908. Serial No. 443,446.

*To all whom it may concern:*

Be it known that I, GUSTAV ADOLF WILHELM KOCH, a subject of the Emperor of Germany, residing at 49 Rue de Rochechouart, Paris, in the Republic of France, have invented a certain new and useful Improvement in Ball-Bearings, of which the following is a full, clear, and exact specification.

This invention relates to ball bearings, particularly to that construction of ball bearings which comprises two concentric rings leaving between them the requisite space for the reception of the balls, the latter running in raceways formed in the rings.

The object is to improve the construction with a view to providing a ball bearing wherein its constituent parts, when once put together, will give an absolutely correct and exact fit without the possibility of any excessive play likely to occur as a result of assembling its parts, as is the case with ball bearings of a similar kind.

The salient feature of the ball bearing constructed in accordance with the present improvement resides in that an inclined or conical surface is formed on a portion of the periphery of the inner ring, preferably for the purpose of facilitating the introduction of the balls between that ring and the outer ring.

In the accompanying drawings: Figure 1 is an elevation of the improved ball bearing in vertical central section. Fig. 2 is a side view of Fig. 1, as seen from left to right. Fig. 3 is a side view of Fig. 1, as seen from right to left. Fig. 4 is a vertical section of the ball bearing after partial assembly of its constituent parts and prior to applying pressure for jamming the inner ring into place in the outer ring. Fig. 5 is a detail section showing the interior of the outer ring beveled off at $g'$.

$a$ is the outer ring of usual construction, in the inner periphery of which is formed a raceway $b$ of comparatively great depth and breadth.

$c$ is the inner ring of less diameter than the outer ring, and having formed in its outer periphery a raceway $d$ which faces the raceway $b$ when the parts are assembled, as in Fig. 1; it is also formed with the usual opening $e$ in the center, for use in fitting, for instance, the ball bearing to a shaft as is customary with bearings of this kind.

$f$ are the balls.

On one side of its raceway $d$, say at the right in Fig. 1, the periphery of the inner ring $c$ is a true circle, as is shown in Fig. 3, while at the opposite side, *i. e.* at the left in Fig. 1, the periphery may be left a true circle on a portion only, say about one half, although it is preferably eccentric on the whole of its surface, as is shown in Fig. 2, it being gradually inclined, cut away or beveled off at $g$. The incline or bevel $g$ thus forms an oblique frusto-conical surface eccentric with reference to the normal periphery of the inner ring $c$ and preferably a surface in which all lines at the intersection thereof by planes coincident with the axis of the ring, are straight, and it may be produced on a lathe or otherwise. The angle of this conical surface in relation to the center or axis of the ring may be described as follows: The distance between the center $h$ and the point 1, taken say at the middle of the raceway $d$, is substantially equal to the distance between the said center $h$ and the point 2, taken say at the outer edge of the incline or bevel $g$, while the distance between the said center $h$ and the point 3, forming so to say a blunt angle at which $g$ and $d$ meet together, is somewhat greater than the distance between $h$ and 1 or between $h$ and 2.

When it is desired to assemble the constituent parts of the ball bearing so as to produce a finished bearing, as shown in Figs. 1, 2 and 3, a certain number of balls $f$, say about one half the total number, is placed inside the outer ring $a$, after which the inner ring $c$ is introduced from right to left into the ring $a$ with its bevel surface $g$ foremost and the raceway $d$ resting upon the balls, as shown in Fig. 4, whereupon the balance of the balls $f$ is inserted in place in the raceway $b$. Pressure is then applied for forcing the inner ring $c$ into its place, concentrically inside the outer ring $a$, such pressure being exerted say from right to left against the ring $c$, in the direction of the arrow. This operation can be performed by means of a screw press or stamping press or in any other appropriate or desired way. When once the inner ring $c$ has been forced into place, it is automatically held in position by the balls $f$ themselves, normally running in their respective raceways.

As distinguished from ball bearings of a similar character, the bearing herein described presents this difference that neither of the rings are heated and, instead of being placed parallel to each other while the assembling operation is being performed, they are in two different planes and that, during the said operation, the inner ring bears against one or only a few of certain balls around which it is made to tilt, with this result that the expansion to which the outer ring or the contraction to which the inner ring is subjected while being put into place is less than that which they would have to undergo if they were parallel to each other.

The advantage arrived at with a bearing as herein described is that the play of the balls is reduced to a strict minimum and that, consequently, the fit being a better one, the bearing runs easy and smooth, with less liability to uneven wear and tear. In other words, the elasticity of the metal of both outer and inner ring $a$ and $c$ is taxed less to accomplish the result than in ball bearings of known construction, it being borne in mind that rings of this nature are mostly made of cemented steel, although other and special kinds of steel can be used.

It is obvious that, instead of forming the incline or conical surface $q$ on the exterior of the inner ring $c$ as shown in Figs. 1, 2 and 4, it may be formed on the interior of the outer ring $a$ as shown at $q'$ in Fig. 5, and yet the same result be obtained.

I claim:

1. In a ball bearing, two integral rings of different diameters adapted to be placed one within the other and having a race-way for the balls in the juxtaposed interior and exterior periphery of the respective rings, the periphery of one of said rings being provided with an eccentric frusto-conical surface at one side of the race-way therein to facilitate the movement of such ring over the balls, into operative relation with the other ring after the balls have been inserted into the race-way of the latter ring.

2. In a ball bearing, two integral rings of different diameters adapted to be placed one within the other and having a race-way for the balls in the juxtaposed interior and exterior periphery of the respective rings, the exterior periphery of the inner one of said rings having an eccentric frusto-conical surface at one side of the race-way therein to facilitate the movement of such ring over the balls, into operative relation with the other ring after the balls have been inserted into the race-way of the latter ring.

3. A ball bearing consisting of two concentric rings with a race-way and balls between them and formed by assembling the balls in proper relation to one ring and forcing the other ring by pressure past said balls and into place with respect to the other ring, one of said rings being formed with an eccentric frusto-conical engaging surface on one side for engaging the balls as the ring is pressed into place.

4. A confining ring for a ball bearing having a concave circular race-way, and a marginal surface on one side of said race-way whose surface is inclined to the cylindrical, the angle of said inclination varying continuously from a certain minimum to a certain maximum.

In witness whereof I have hereunto set my hand this 3rd day of July 1908 in presence of two subscribing witnesses.

GUSTAV ADOLF WILHELM KOCH.

Witnesses:
 LOUIS RINNY,
 EDITH BETHELL.